United States Patent

[11] 3,572,776

[72] Inventors David P. Herd
 Houston;
 Charles D. Morrill, Bellaire, Tex.
[21] Appl. No. 802,926
[22] Filed Feb. 27, 1969
[45] Patented Mar. 30, 1971
[73] Assignee Rockwell Manufacturing Company
 Houston, Tex.

[54] FLUID FLOW APPARATUS
 5 Claims, 5 Drawing Figs.
[52] U.S. Cl. .................................................. 285/302,
 285/315, 285/330
[51] Int. Cl. ..................................................... F16l 15/02
[50] Field of Search .......................................... 285/298-
 —303, 330, 170, 165, 315; 166/0.6, 85

[56] References Cited
UNITED STATES PATENTS
| | | | |
|---|---|---|---|
| 322,457 | 7/1885 | Kouh............................ | 285/330 |
| 834,277 | 10/1906 | Elwell........................... | 285/302X |
| 1,889,868 | 12/1932 | Montgomery................ | 285/299X |
| 3,466,062 | 9/1969 | Deplante...................... | 285/302X |

FOREIGN PATENTS
| | | | |
|---|---|---|---|
| 601,742 | 7/1960 | Canada ........................ | 285/165 |

Primary Examiner—Dave W. Arola
Attorneys—Bill B. Berryhill, Murray Robinson, Ned L. Conley and Robert W. B. Dickerson ABSTRACT: Fluid flow apparatus for passage of through-flowline tools comprising two conduits having a common flow axis and adapted for limited longitudinal movement relative to each other while maintaining flow fluidtight communication therebetween provided with means for preventing the stopping of through-flowline tools within the conduits at any position of longitudinal movement. One embodiment comprises alternate longitudinal fingers and open end slots cut in the end of each conduit, the fingers of each conduit engaging the slots of the other conduit. Another embodiment comprises a spring mounted in an enlarged bore portion of one of the conduits and bearing against the end of the other conduit which telescopically engages the enlarged bore portion.

PATENTED MAR 30 1971
3,572,776
SHEET 1 OF 2
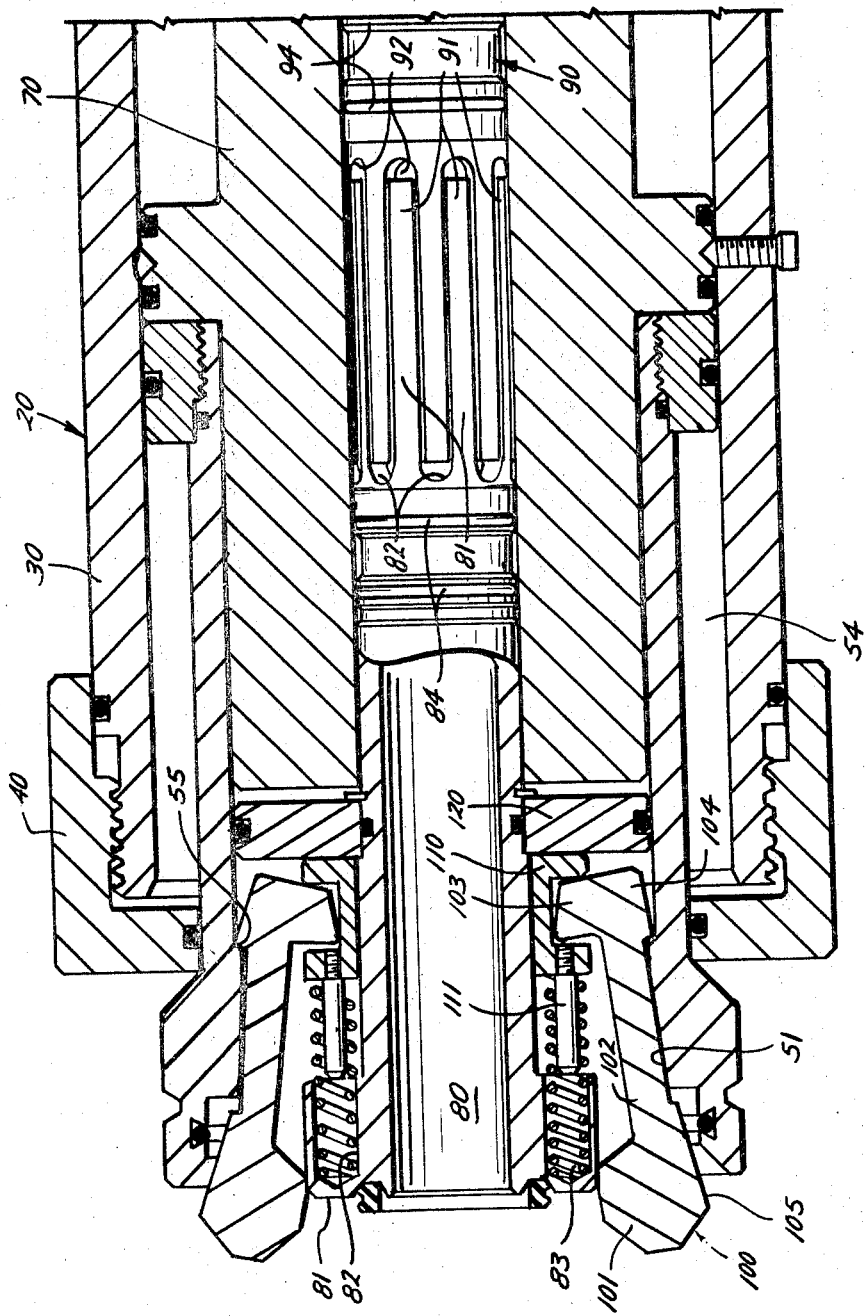
Fig. 1
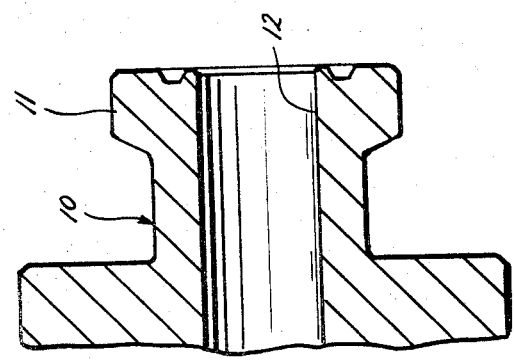
David P. Herd
Charles D. Morrill
INVENTORS
BY Bill B Berryhill
ATTORNEY

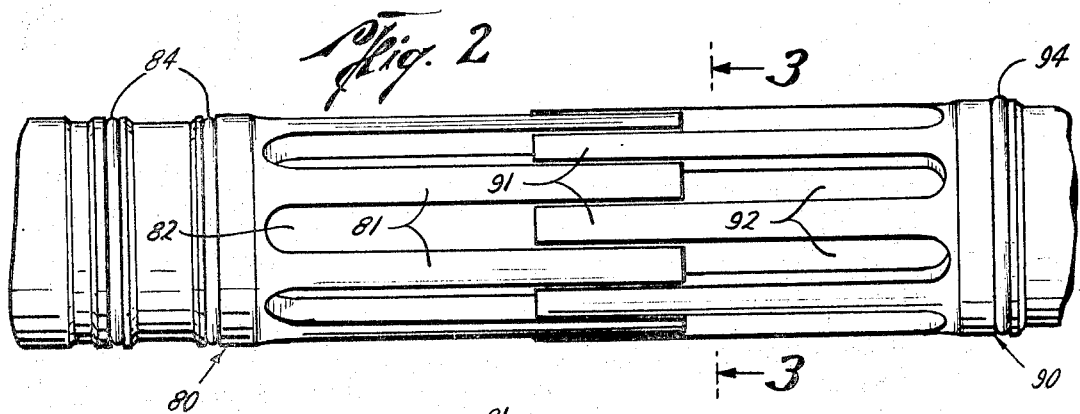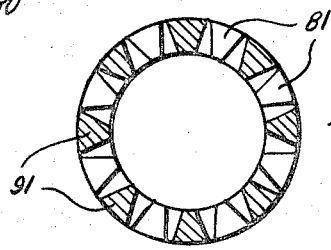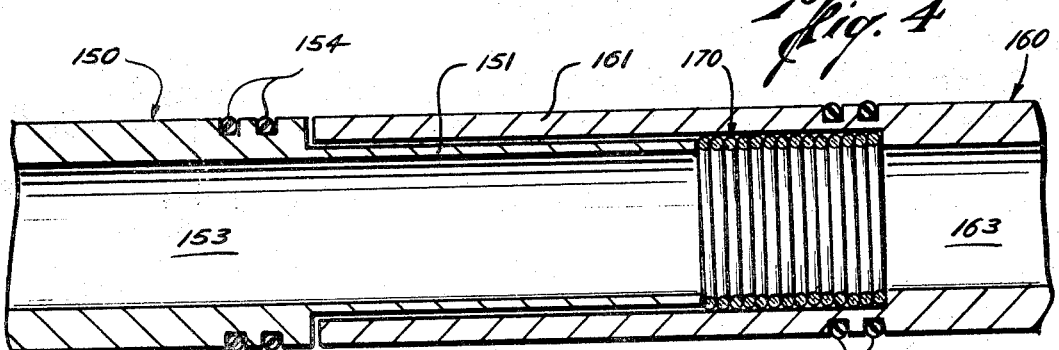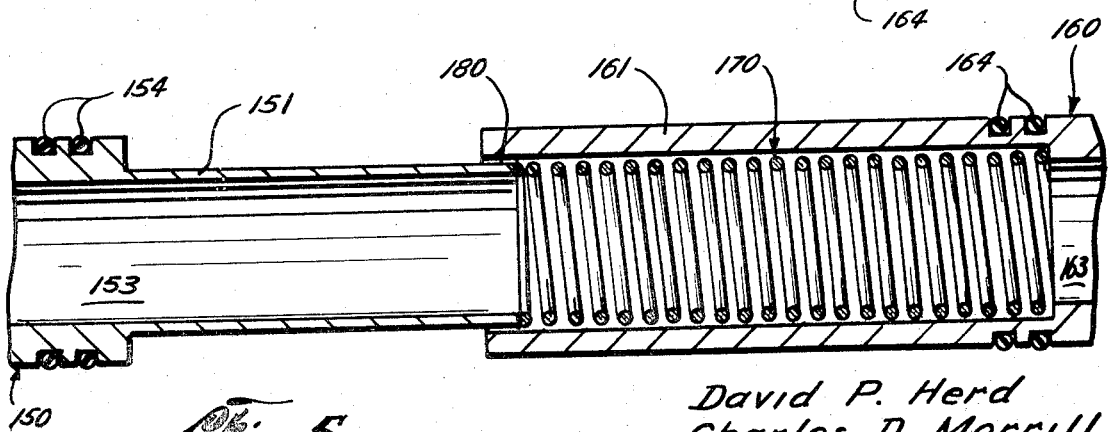

3,572,776

FLUID FLOW APPARATUS

BACKGROUND OF THE INVENTION

1. Field of the Invention

This invention concerns fluid conduits. More specifically it concerns apparatus for use with telescoping conduits to allow passage of solid bodies through the conduits which might otherwise hang up in excessive pockets or gaps created by the telescopic movement of the conduits.

2. Description of the Prior Art

The petroleum industry has made great strides in underwater drilling and production in the past few years. Completion equipment for underwater wells has progressed to a point where much of the installation and operation is done by remote control.

One of the last phases to undergo remote control treatment has been the connection of an underwater flowline to the underwater wellhead or Christmas tree. In the past divers have been largely relied on to make such connections.

Recently, however, systems and apparatus for implementation thereof have been developed for remotely connecting the wellhead and production flowlines. Many of these systems utilize a connector unit which is lowered into place at the wellhead and caused to remotely connect the wellhead in fluid-tight flow communication with the flowline. This fluidtight flow communication is usually accomplished through a sliding telescopic conduit connection. Such a system and apparatus is shown in copending U.S. Pat. application Ser. No. 679,858.

Normally, when two conduits are connected in a sliding telescopic fit the inside diameter of one conduit must be less than the other. When the conduits are extended a shoulder or pocket is created due to these diameter differences. This creates no problem from a fluid flow standpoint. However, it does create a problem if through-flowline tools are used. These through-flowline tools are propelled through the flowline into the well tubing and back out for various purposes. Many of these tools are provided with latch devices for latching in a certain location in the well and some are provided with other apparatus which would catch on an abrupt shoulder or obstruction. Thus, the remote telescopic conduit connection of the prior art may cause these tools to latch or hang up in the connector unit.

SUMMARY OF THE INVENTION

In the present invention apparatus is provided which will prevent the latching or hanging of through-flowline tools or the like in a telescopic conduit connection. In one embodiment alternate longitudinal fingers and slots are cut in the end of each of the telescoping conduits. The fingers of one conduit engage the slots of the other throughout limited longitudinal movement of the conduits relative to each other. The slot widths are small enough to prevent engagement of the tool latches.

In another embodiment a coil spring is mounted in an enlarged bore portion of one conduit, bearing against the end of the other conduit. The internal diameter of the spring is approximately the same as the conduit flow bores. It's pitch in the expanded position is small enough to prevent the tool latches from engaging the spring and stopping the tool in the conduit.

Thus, a remote flowline connector with remotely movable and engageable conduits therethrough may be used without the insertion of a special tool or fear of premature tool latching and stopping. This is accomplished simply and economically.

BRIEF DESCRIPTION OF THE DRAWINGS

Other objects and advantages of the invention will become apparent from the description which follows when taken in conjunction with the attached drawings in which:

FIG. 1 is a sectional elevation view of an underwater Christmas tree hub and a portion of a flowline connector unit utilizing a preferred embodiment of the invention shown in the retracted position;

FIG. 2 is an elevation view of the moveable conduits according to the embodiment shown in FIG. 1 but shown in the extended position;

FIG. 3 is a cross-sectional view of the conduits of FIG. 2 taken along the line 3–3 in FIG. 2;

FIG. 4 is a sectional elevation view of flow apparatus according to another preferred embodiment of the invention shown in the retracted position; and FIG. 5 is a sectional elevation view of the apparatus of FIG. 4 but in the expanded or extended position.

DESCRIPTION OF THE PREFERRED EMBODIMENTS

Referring first to FIG. 1, a portion of a remotely operated underwater flowline connector unit 20 is shown in retracted position for remote connection to a flowline exit hub 10 of an underwater Christmas tree (not shown) of which it is an integral part. The connector unit 20 has been lowered into place and may be supported on a frame (not shown) provided therefor. The right-hand side of connector 20 (not shown) may be constructed as a mirror image of the left-hand side for connection to a hub similar to hub 20 but attached to the end of a flowline. Alternately it may be directly connected to a flowline above the water and lowered into place with the flowline.

The connector unit 20 comprises cylindrical housing 30, housing-ring 40, latch cylinder 50, piston ring 60, nipple receptacle 70 and sliding nipples 80 and 90. Nipple 80 is provided with a flanged end 81 and a seal ring 82 mounted in an annular recess in the end of flange 81. Mounted around the end of nipple 80 is a plurality of latch members 100 having a lip portion 101, shank 102, foot 103 and heel 104. The latches 100 are retained by retainer collar 110 and the end of latch cylinder 50. Nipple flange 81 is provided with spring mounting holes 82 in which are mounted springs 83. These springs 83 surround pins 11 projecting from retainer collar 110 and bias the retainer collar toward pressure plate 120 which also surrounds nipple 80 and is affixed thereto.

After the connector unit 20 is lowered into place in its retracted position as shown, pressure is applied to the right-hand side of piston ring 60 and pressure plate 120 through a port (not shown) in casing 30. Since nipple receptacle 70 is stationarily affixed to housing 30 by a plurality of setscrews 31 and sealed thereto by seals 71 and 72, piston ring 60, latch cylinder 50, pressure plate 120, and nipple 80 all move toward Christmas tree hub 10. When nipple flange 81 butts up against tree hub flange 11, nipple 80 and pressure plate 120 cease to move. However, piston ring 60, latch cylinder 50, latches 100 and retainer collar 110, continue to move in the same direction, compressing spring 111 until latch lips 101 fall behind tree hub flange 11. The backs 105 of latches 100 are tapered and cooperate with a tapered surface 51 on latch cylinder 50 to wedge latches 100 into tight engagement with hub flange 11. This causes seal 82 to sealingly engage nipple flange 80 and hub flange 11 providing fluidtight flow communication between the bore 12 of hub 10 and nipple 80. The tapers on latch backs 105 and latch cylinder surface 51 are self-locking, so that pressure might be removed without releasing the connection.

To release the connection, pressure would be applied in the annular space 54 surrounding latch cylinder 50. An annular shoulder 55 on latch cylinder 50 would catch heel 104, causing the latches 100 to kick out from behind hub flange 11, releasing the moving parts of connector 20 for return to the retracted position.

The construction of nipples or conduits 80, 90 and nipple receptacle 70 is very important. For instance, if nipples 80 and 90 were simply cut square on their adjacent ends and butted up against each other in the retracted position, they would leave a gap between their ends when in the extended position. This would prevent the usage of some through-flowline tools being used today. When the tools were propelled through the flowline toward the well they would probably hang up in the connector since latching devices, which they are normally equipped with, would engage the gaps or pockets between the extended conduits.

To prevent such hang up, nipples 80 and 90 are provided with latch prevention means. In the embodiment shown in FIGS. 1, 2 and 3 the latch prevention means takes the form of interleaved fingers 81 and 91. These fingers are formed by milling longitudinal slots 82 and 92 open at one end about each of the nipples 80 and 90. Then when the nipples are mounted in the connector unit 20, the fingers of each nipple are placed in the milled slots of the other nipple. In the retracted position of FIG. 1 the milled slots 82 and 92 are almost filled up by the fingers 81, 91. In the extended position shown in FIG. 2, only the ends of fingers 82 and 91 engage the slots 82 and 92. However, no continuous annular shoulder is exposed. The slots 82 and 92 are cut with a width smaller than the width of any latching device which is to be passed therethrough. Therefore, no gap or pocket is formed which is of sufficient size to trap any through-flowline tools passing through the conduits 80 and 90.

Each of the nipples 80, 90 are provided with seal rings 84, 94 which sealingly and slidingly engage the bore of nipple receptacle 70. This prevents flowline fluid from escaping from the nipples 80, 90 and connector unit power fluid from entering the flowline.

An alternative construction for nipples 80 and 90 is shown in FIGS. 4 and 5. Nipples 150 and 160 correspond with nipples 80 and 90 of FIGS. 1, 2 and 3 and could be substituted therefor. In this embodiment the end of nipple 150 has a reduced external diameter portion 151 and the end of nipple 160 has an increased internal diameter portion 161, allowing the nipples to engage in a sliding telescopic fit. The length of increased internal diameter portion 161 is such that in the fully retracted position of FIG. 4 a pocket is formed which permits the insertion of a compressed coil spring 170. The inside diameter of spring 170 is approximately the same as the flow bores 153 and 163 of nipples 150, 160.

When nipples 150, 160 are moved longitudinally to the fully extended position of Fig. 5, coil spring 170 expands as shown. The spring 170 is selected so that its pitch in the expanded position is small enough to prevent the engagement of the latch devices of any through-flowline tools which may pass therethrough. A pitch of less than the longitudinal dimensions of the latches plus the tangent of the pitch angle times the latch lateral dimension would be sufficient. Annular seals 154, 164 serve the same function as seals 84, 94 in the first embodiment described if nipples 150, 160 are mounted in a common bore such as the bore of the receptacle 70.

Both of the preferred embodiments described could be altered slightly yet perform substantially in the same way. For example, the second embodiment described could be provided with cooperative seal means installed between the end portions 151 and 161 near 180, permitting nipples 160, 170 to operate independently of a surrounding bore. One of the nipples 80, 90 of the first embodiment described could be adapted to completely surround the other so that a surrounding bore such as receptacle 70 would not be necessary. Although the preferred embodiments have been described for use with a flowline connector unit, they could obviously be adapted for several other applications requiring interconnecting conduit joints with limited longitudinal movement.

We claim:

1. Fluid flow apparatus comprising at least two conduits having a common flow axis, flow bores of substantially the same diameter and adapted for limited longitudinal movement relative to each other while maintaining fluidtight flow communication therebetween, characterized in that one of said conduits has an enlarged counterbore in which one end of the other conduit is telescopically received for said limited movement, and means terminating said counterbore within said one of said conduits, a coil spring being mounted in said counterbore and bearing against said end of said other conduit, and said means the internal diameter of said coil spring being approximately the same as the flow bore diameter of said conduits.

2. Fluid flow apparatus as set forth in claim 1, characterized in that each of said conduits is mounted for telescopic movement within a common surrounding bore, cooperative seal means being provided between said common bore and each of said conduits.

3. Fluid flow apparatus comprising at least two tubular conduits having a common flow axis, one conduit being telescopically received within an enlarged bore portion of another conduit, a coil spring being mounted within said enlarged bore portion between the end of said one conduit and an annular shoulder adjacent said enlarged bore portion, said conduits being mounted for limited longitudinal movement relative to each other whereby said spring is compressed at one end of said movement and expanded at the other end of said movement, the internal diameter of said spring being substantially the same as the internal diameter of said tubular conduits adjacent the ends of said spring.

4. Fluid flow apparatus as set forth in claim 3 in combination with a through-flowline tool for passing through said conduits which has outwardly biased latch means having a longitudinal dimension and a lateral dimension, the pitch of said coil spring in said expanded condition being less than said longitudinal dimension plus the tangent of the spring pitch angle times said lateral dimension, preventing said latch means from engaging said spring.

5. Fluid flow apparatus as set forth in claim 3 characterized by annular seal means on said conduits cooperating with said conduits to provide fluidtight flow communication between said conduits throughout said limited longitudinal movement.